United States Patent [19]

Ebbing et al.

[11] Patent Number: 4,635,441
[45] Date of Patent: Jan. 13, 1987

[54] POWER DRIVE UNIT AND CONTROL SYSTEM THEREFOR

[75] Inventors: Steven J. Ebbing; Robert J. Hermans; John J. Vicari, all of Rockford; Bruce D. Beneditz, Roscoe, all of Ill.

[73] Assignee: Sundstrand Corporation, Rockford, Ill.

[21] Appl. No.: 731,663

[22] Filed: May 7, 1985

[51] Int. Cl.⁴ .............................................. F16D 31/02
[52] U.S. Cl. ..................................... 60/450; 60/911; 91/506
[58] Field of Search ........................ 60/450, 911, 445; 91/506

[56] References Cited

U.S. PATENT DOCUMENTS

| | | | |
|---|---|---|---|
| 2,526,835 | 10/1950 | Tucker | 60/427 |
| 3,163,115 | 12/1964 | Neff et al. | 417/222 |
| 3,277,706 | 10/1966 | Godet | 73/189 |
| 3,296,797 | 1/1967 | Tlusty | 60/450 |
| 3,354,978 | 11/1967 | Budzich | 180/44 |
| 3,720,108 | 3/1973 | Freitag | 73/398 R |
| 3,965,682 | 6/1976 | Herchenröder | 60/450 X |
| 3,984,978 | 10/1976 | Alderson | 60/445 |
| 4,096,694 | 1/1978 | Habiger | 60/445 |
| 4,103,489 | 8/1978 | Fletcher | 60/911 |
| 4,132,072 | 1/1979 | Schlinke | 60/445 X |
| 4,189,920 | 2/1980 | Dezelan | 60/445 |
| 4,191,094 | 3/1980 | Flippo | 91/506 |
| 4,194,363 | 3/1980 | Young | 60/445 |
| 4,210,066 | 7/1980 | Aldrich | 91/506 |
| 4,399,886 | 8/1983 | Pollman | 60/445 |
| 4,474,104 | 10/1984 | Creffield | 91/497 |
| 4,487,109 | 12/1984 | Burandt et al. | 91/506 |

*Primary Examiner*—Carlton R. Croyle
*Assistant Examiner*—Paul F. Neils
*Attorney, Agent, or Firm*—Wood, Dalton, Phillips, Mason & Rowe

[57] ABSTRACT

A power drive unit and control system therefor avoiding performance degradation which can occur in control of the variable displacement hydraulic motor of the power drive unit by measurement of the angle of a displacement-setting wobbler of the motor and the speed of the motor. This is avoided by sensing flow through the motor which provides an indirect measure of wobbler position and speed of motor operation. The power drive unit and control system therefor has a variable displacement hydraulic motor with a displacement-setting wobbler positioned by pressure applied to a servo piston by an electro-hydraulic servo valve. The control system responds to a speed command having a value dependent upon a position loop which determines the relation between the actual position of a load and a commanded position, with the control providing for a maximum possible speed of motor operation under a particular load condition with a substantially constant rate of fluid flow through the motor. As the load varies, the flow through a flow-regulator valve varies and flow is sensed by a linear variable differential transformer associated with the valve member of the flow regulator. The linear variable differential transformer outputs a control voltage indicative of a variation in either direction from the desired rate of fluid flow through the motor which is used to adjust the angle of the wobbler to bring the flow to the desired rate and the motor is caused to operate at a maximum possible speed. The control, by using a speed command responsive to a position loop, provides a controlled snubbing action to reduce the speed of the motor as the load approaches the commanded position.

8 Claims, 3 Drawing Figures

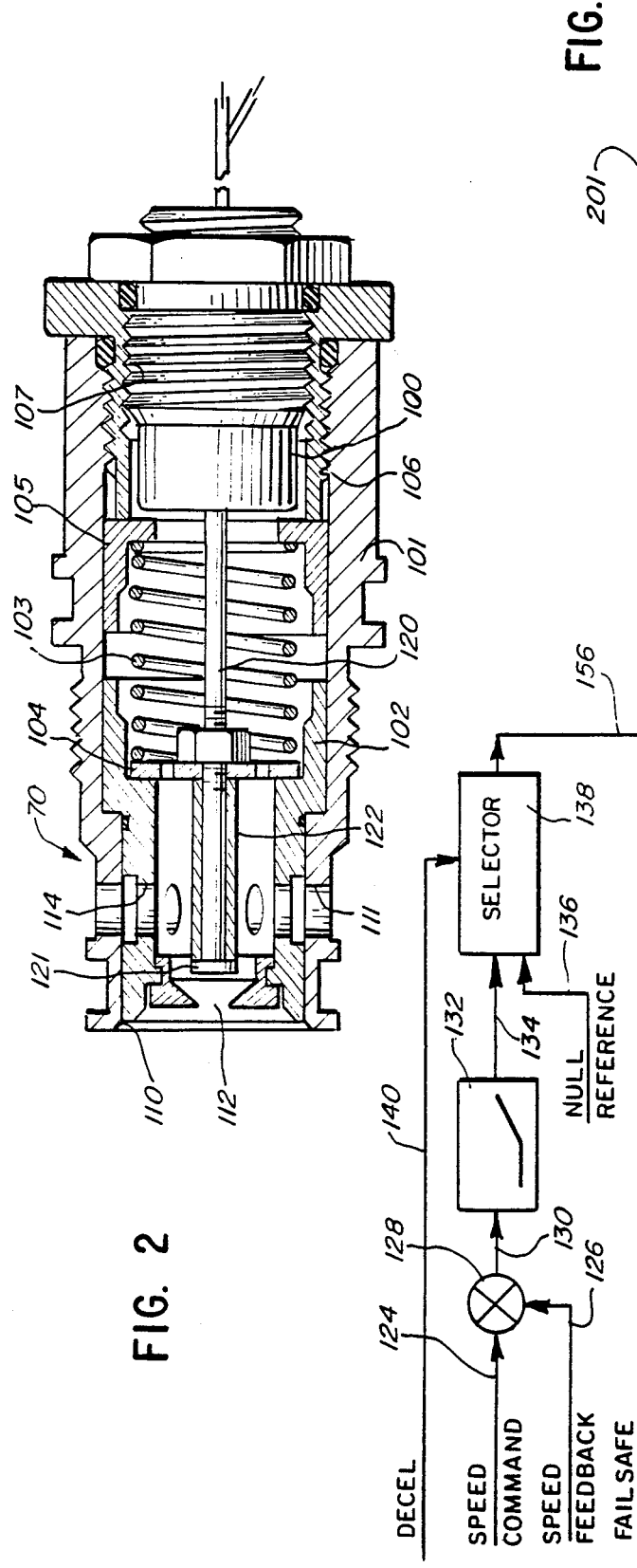

POWER DRIVE UNIT AND CONTROL SYSTEM THEREFOR

DESCRIPTION

1. Technical Field

This invention relates to a hydraulic power drive unit having a variable displacement hydraulic motor for driving a load under both aiding and opposing load conditions and which is operable at a variable maximum speed, dependent on the load condition with a substantially constant rate of fluid flow through the motor and with the control being accomplished by flow-regulating means which senses the flow through the motor and limits the maximum flow rate.

2. Background Art

Power drive units having a variable displacement hydraulic motor for driving a load under both aiding and opposing load conditions are well known in the art.

The Flippo U.S. Pat. No. 4,191,094, owned by the assignee of this application, discloses a power drive unit having a variable displacement hydraulic motor and a control therefor including a torque-sensing piston to provide for operation of the motor at the smallest displacement required to provide the necessary torque while operating at the maximum possible speed for each load condition encountered by the motor.

The assignee-owned Aldrich U.S. Pat. No. 4,210,066 discloses a power drive unit having a variable displacement hydraulic motor. The control system for the motor provides for setting of the motor at either minimum or maximum displacement conditions.

A further development of the assignee is shown in the Burandt et al U.S. Pat. No. 4,487,109. A power drive unit has a variable displacement hydraulic motor with a wobbler for setting displacement. An electro-hydraulic servo valve controls the position of the wobbler and is operable in response to a number of signals including a signal derived from a wobbler-positioned transducer unit.

A refinement to a control of the type shown in the aforesiad Burandt et al patent is disclosed in the Durtschi application Ser. No. 633, 211, filed July 19, 1984, wherein the signal indicating wobbler position is applied to the electro-hydraulic servo valve by a direct mechanical connection between the wobbler and the electro-hydraulic servo valve. In both instances, the control includes the generation and utilization of a signal representing the velocity of the output shaft of the motor.

Control systems for power drive units which adjust hydraulic motor displacement to match the load by measuring motor shaft velocity and wobbler position can, because of tolerances, yield performance degradation of 10%–15%.

The power drive units have many uses where hydraulic power is required in aircraft and space vehicles, such as control of flaps or other flight control surfaces. More recently, military aircraft have incorporated movable components which are operated for a very short period of time. With a short energized time for the power drive unit, the control systems of the prior art cannot compensate for null shifts in the valve for positioning the wobbler by integrating the error with a large time constant integrator with resulting degradation in performance.

The invention to be described herein improves on the foregoing control systems for a hydraulic power drive unit by directly sensing fluid flow from the motor as an indication of motor speed and wobbler position, representing motor displacement, to generate an electrical signal used to control wobbler position to achieve the fastest possible motor speed under existing load conditions with a substantially constant rate of fluid flow through the motor.

DISCLOSURE OF THE INVENTION

A primary feature of the invention disclosed herein resides in optimization of operation of a hydraulic power drive unit having a variable displacement hydraulic motor to maximize motor speed under varying load conditions with a substantially constant rate of fluid flow through the motor and with the control being achieved by the use of a flow-regulator valve which senses the rate of fluid flow through the motor and limits the flow through the motor.

The control system for the power drive unit provides for improved accuracy of control over the previously known conventional control systems which measured the angle of an adjustable wobbler to control the displacement of the variable displacement hydraulic motor and, thus, the speed of the motor. The control system embodying the invention incorporates a linear variable differential transformer within a flow-regulating valve. The flow-regulating valve has a valve member responsive to a pressure differential established by the rate of fluid flow to thereby sense the rate of fluid flow from the motor. The linear variable differential transformer is associated with the valve member to provide a signal proportional to a rate of fluid flow which is utilized to adjust the wobbler of the motor to adjust motor displacement and control horse-power of the motor.

An object of the invention is to provide a hydraulic power drive unit using a variable displacement hydraulic motor wherein performance of the motor under both aiding and opposing loads is optimized to achieve maximum possible speed at a constant fluid flow rate through the motor by adjusting a displacement-setting wobbler of the variable displacement hydraulic motor according to load on the motor, with the load being determined by a flow-regulator valve which limits the maximum flow rate and which has a valve member positionable by a pressure differential varying with the rate of fluid flow. A linear variable differential transformer senses the movement of the valve member to signal variation in the rate of fluid flow with the signal being utilized by control circuitry for necessary adjustment of the motor displacement.

Another object of the invention is to provide a hydraulic power drive unit having a variable displacement motor for moving a load under both aiding and opposing load conditions at the maximum speed possible for the load condition with a substantially constant desired rate of fluid flow through the motor comprising, means for adjusting motor displacement, means for regulating fluid flow from the motor, and means responsive to a variation in said desired rate of fluid flow as detected by the flow-regulating means for operating said motor displacement adjusting means.

Still another object of the invention is to provide a hydraulic power drive unit having a variable displacement motor and means for controlling the displacement of the motor to maximize the speed of the motor operating under varying loads and supplied with motive fluid at a substantially uniform rate of flow comprising, a flow-regulating valve through which fluid flows from the motor, adjustable means for setting the displacement of the motor, control means for said setting means to maintain a rate of flow through the flow-regulating valve within a predetermined range, and means for sensing the rate of flow through said flow-regulating valve in excess of said predetermined range for causing said displacement-setting means to reduce the displacement of the motor and increase the speed of the motor.

An additional object of the invention is to provide a hydraulic power drive unit as defined in the preceding paragraph with a snubbing feature including means for increasing the displacement of the motor to reduce the motor speed as the motor-driven load approaches a commanded position.

BRIEF DESCRIPTION OF THE DRAWINGS

FIG. 2 is a longitudinal sectional view of a flow-regulator valve and linear variable differential transformer used in the control system; and FIG. 3 is a block diagram of the control system.

BEST MODE FOR CARRYING OUT THE INVENTION

Figure 1:
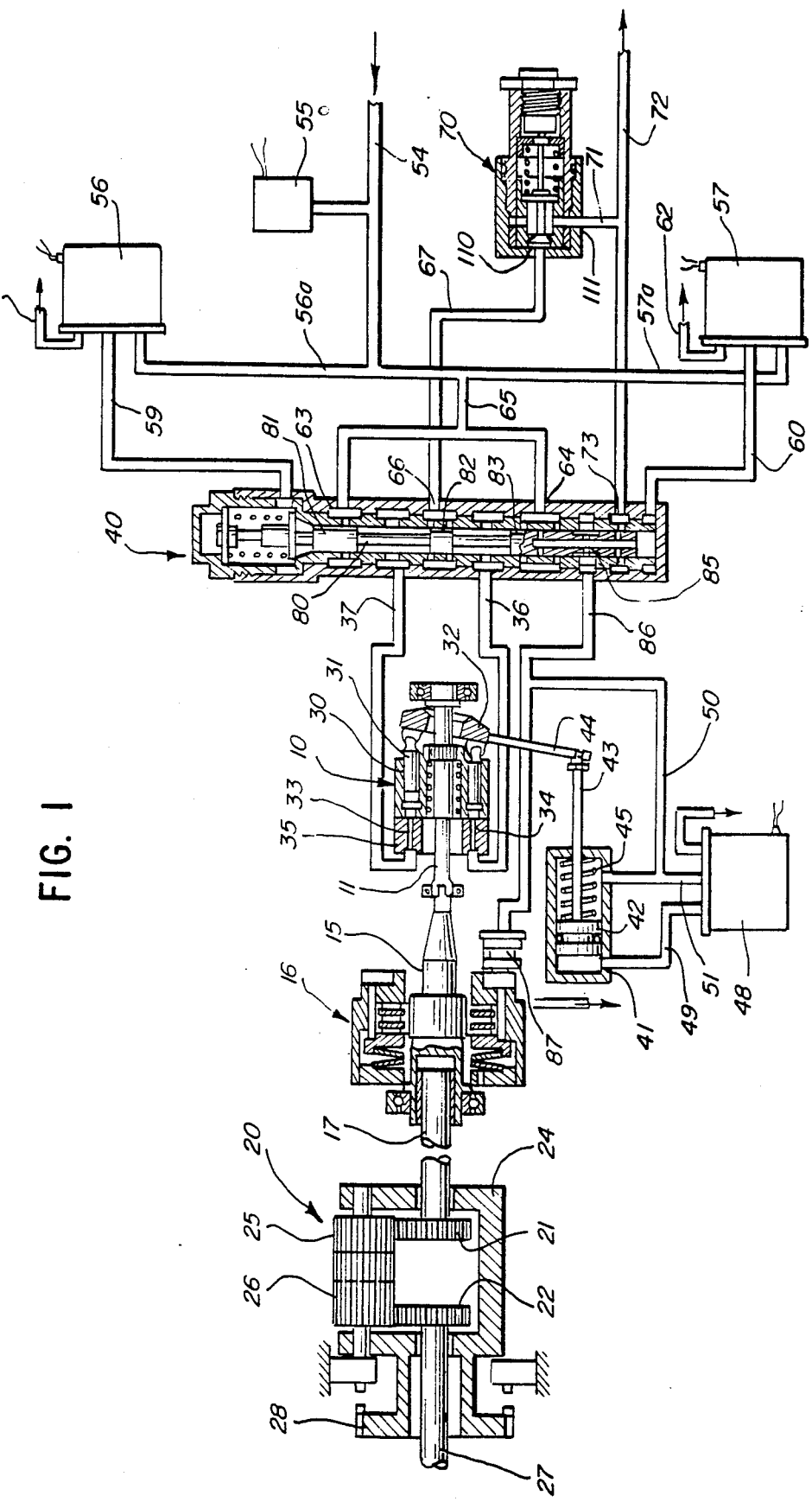
FIG. 1 is a hydraulic schematic of the hydraulic power drive unit and control system therefor.

The power drive unit has a variable displacement hydraulic motor, indicated generally at 10, with an output shaft 11 which connects to a rotatable member 15 of a releasable brake, indicated generally at 16, and which connects to an input shaft 17 of a sun-to-sun differential, indicated generally at 20. The differential has sun gears 21 and 22, with the sun gear 21 fixed to the input shaft 17 and a planet carrier 24 carrying planet gears 25 and 26 which mesh with the respective sun gears. The sun gear 22 is carried on an input shaft 27 associated with a redundant power drive unit, comparable to that shown in FIG. 1, whereby the variable displacement hydraulic motor 10 of either power drive unit may drive a load. The load is in driving relation with the planet carrier 24 through a gearbox and a meshing gear 28. When one power drive unit is in operation, the brake 16 of the other power drive unit will be engaged to hold the input shaft and the sun gear of the other power drive unit against rotation. For example, with the input shaft 17 held against rotation, drive of the input shaft 27 will cause rotation of the planet carrier 24. Conversely, if the motor 10 of the power drive unit shown in FIG. 1 is operating, the brake associated with the motor of the other power drive unit will be set and the input shaft 27 will not be free to rotate whereby the drive of the planet carrier 24 will be through the sun gear 21 in driving relation with the motor 10.

The variable displacement hydraulic motor is of a type commonly used in a power drive unit and is of the axial piston type having a rotatable cylinder block 30 fixed to the motor shaft 11 and having a series of bores, each of which movably mounts a piston 31 that has its stroke controlled by a pivotally-mounted adjustable wobbler 32. In each revolution of the cylinder block 30, the pistons are caused to travel past a pair of arcuate ports 33 and 34 in a valve plate 35 and which connect to a pair of fluid lines 36 and 37, respectively. One of these fluid lines functions as a fluid pressure line and the other as a return line, dependent upon the position of a motor and brake control valve, indicated generally at 40.

Displacement-setting means for the variable displacement hydraulic motor 10 comprises a servo cylinder 41 having a servo piston 42 with a rod 43 which connects to an arm 44 fixed to the wobbler 32. The wobbler 32 is urged toward a position to set maximum pump displacement by a spring 45 in the servo cylinder and which acts on the servo piston 42.

A three-way electro-hydraulic servo control valve 48 is operable by a control circuit to be described to apply a pressure signal to the servo piston 42 in opposition to the urging of the spring 45 and system pressure applied on a smaller working area to set the motor displacement. The three-way electro-hydraulic servo valve is a commercially-available valve and has a connection to the servo cylinder by a line 49 and is supplied with fluid pressure through a pressure supply line 50 which connects to a line 51 extending between the spring side of the servo cylinder 41 and the servo valve 48.

The power drive unit is supplied with fluid at system pressure through a supply line 54 with the pressure of the fluid being sensed by a pressure switch 55. The motor 10 is operable in either of two directions of rotation and the direction of rotation is controlled by which of the valve ports 33 and 34 communicates with system pressure. This communication is controlled by a pair of pilot valves 56 and 57 which are each connected to the system pressure line 54 through lines 56a and 57a, respectively. A line 59 extends from the pilot valve 56 to the motor and brake control valve 40 and a line 60 extends from the pilot valve 57 to an opposite end of the motor and brake control valve 40 and each of the pilot valves has a return line 61 and 62.

System pressure is also delivered to a pair of ports 63 and 64 of the motor and brake control valve 40 through a branch line 65 extending therebetween and the system pressure line 57a extending to the pilot valve 57. An additional port 66 of the motor and brake control valve 40 connects by a return line 67 to a flow-regulator valve 70 having a discharge line 71 connected into a system return line 72 which also extends to a port 73 of the motor and brake control valve 40.

The motor and brake control valve 40 has a valve member 80 which is spring-centered and has three control lands 81, 82 and 83 which control communication of supply pressure at ports 63 and 64, with one or the other of the fluid lines 36 and 37 extending to the motor ports. The control land 82 controls connection of the motor ports with the return line 67 through the port 66. Additionally, a control section 85 of the valve controls the communication of a line 86 connected to the pressure supply line 50 leading to the electrohydraulic servo valve 48 and to a piston 87 associated with the brake 16 to either the fluid pressure port 64 or the system return line 72 connected into the port 73. The brake 16 is normally set to prevent rotation when the line 86 is connected to the system return line 72 and when the valve member 80 shifts either up and down relative to the position shown in FIG. 1, supply pressure acts on the piston 87 to release the brake and free the drive by the motor 10. The shifting of the valve member 80 is under the control of the pilot valves 56 and 57 which selectively deliver pilot pressure to one or the other of a pair of pilot surfaces at opposite ends of the valve member. Only one of the pilot valves is operable at any one time.

The planet carrier 24 is connectable to mechanism movable between two limit positions under the control of the motor 10. Various loads can be encountered during these movements and the load can also be either aiding or opposing. When the load is opposing, the motor must provide torque for movement of the mechanism. When the load is aiding, there is a back drive from the load to the motor and the motor controls the speed of movement of the mechanism, even though not delivering torque to the load.

The disclosed power drive unit achieves operation at the maximum possible speed under all load conditions at a substantially constant rate of fluid flow.

Accurate flow control with motor speed control is achieved by use of the flow-regulator 70 which is shown in detail in FIG. 2, with the control system shown in FIG. 3 which receives a signal from a linear variable differential transformer 100 (having the acronym LVDT) associated with the flow-regulator valve. The LVDT signal is an indication of the flow rate from the motor as detected by movement of a valve member of the flow-regulator valve.

The flow-regulator valve has a tubular body 101 in which a valve member 102 is movably mounted. The valve member 102 is urged to the position shown by urging means in the form of a spring 103 acting between a perforate disc 104 engaging against an internal shoulder of the valve member and a cup-shaped member 105 in the bore of the valve body. The cup-shaped member 105 is held against endwise movement by a closure member 106 threaded into an end of the valve body and which is internally threaded at 107 to threadably mount the LVDT 100.

The valve body 101 has a valve inlet 110 communicating with the return line 67 extending from port 66 of the motor and brake control valve 40 and annularly-spaced outlet ports 111 communicating with the line 71 connected to the system return line 72.

The flow-regulator valve 70 operates in a conventional manner to control the rate of fluid flow between the valve inlet 110 and the outlet ports 111 in response to a pressure differential across an orifice 112 formed in an end wall of the valve member 102 with the pressure differential varying with the rate of fluid flow therethrough. The flow-regulator valve achieves regulation of the fluid flow rate by variable restriction of the outlet ports 111 by relative movement with respect thereto by circumferentially-spaced radial ports 114 in the valve member 102. As seen in FIG. 2, there is no flow restriction between the valve member radial ports 114 and the outlet ports 111. As the pressure differential becomes sufficient to compress the spring 103, the valve member 102 will move toward the right, as seen in FIG. 2, to cause a restriction in the flow communication between the radial ports 114 and the outlet ports 111 to restrict the fluid flow rate.

The LVDT 100 is a commercially-available type of structure known for electrically signalling small displacements. The LVDT has a movable core which moves relative to primary and secondary windings and outputs a voltage. The core of the LVDT 100 moves with the valve member 102 by means of a connecting rod 120 connected to the valve member 102 and the core of the LVDT. As seen in FIG. 2, the connecting rod 120 has a head 121 engaged with a spacer 122 surrounding a part of the rod and abutting the aperture disc 104 and held in tight association therewith by a nut threaded onto an intermediate threaded part of the rod.

The control system shown in FIG. 3 provides for adjustment of the motor wobbler 32 according to load on the motor in order to provide the maximum possible motor speed with a substantially constant rate of fluid flow through the motor. In one application, the power drive unit is used for positioning of a rotary launcher mounted on an aircraft. The control system provides for inputting a speed command signal 124 and a speed feedback signal 126 into a summing block 128. The speed command signal is derived from determining the difference between the actual position of the rotary launcher and its desired position, with the magnitude of the speed command signal being proportional to the amount of this difference. The speed feedback signal 126 represents the actual speed of the rotary launcher. The summing block 128 produces an error signal 130 which is input to a ramping block 132 which produces an output signal 134 proportional to the error with upper and lower limits. The output signal from the ramping block 132 is input to a selector block 138 along with a null reference value 136 and a decel signal 140. The selector block 138 outputs a reference signal 156 used in a summing block 154 of the control loop for the electrohydraulic servo valve 48 for wobbler positioning. The summing block 154 also receives a voltage signal 157 from the LVDT 100. The summing block 154 provides an error signal 158 which is input to a proportional and integral control loop having appropriate constants, limits and presets and identified by blocks 159, 160, 161 and 162 and a summer 163 which provides a current output 172. The current output 172 passes through a valve drive unit 173 for delivery through a line 174 to the electrohydraulic three-way servo valve 48 which sets a control pressure proportional to the current output 172 to establish the position of the wobbler against the action of the spring 45.

Under normal operating conditions, the reference signal 156 would be zero to have the wobbler 32 in a minimum displacement-setting position to produce maximum speed with substantially constant flow through the motor.

The flow-regulator valve 70 has a pressure curve wherein pressure drop through the flow-regulator increases gradually with increasing low hydraulic flow. The pressure curve has a "knee" wherein the pressure drop increases substantially with increased hydraulic flow and the current output 174 from the control system is adjusted to position the wobbler 32 such that pressure drops in the system result in operation at the "knee" of the flow-regulator which is the optimum performance point.

When operating at the "knee" the valve member 102 is to the right from the position shown in FIG. 2 and is modulating flow therethrough, with the result that the rod 120 has shifted the core of the LVDT 100 to a position wherein the LVDT would be in a null position and changes in rate of flow either up or down would result in a change in the pressure differential acting on the valve member 102 for causing movement thereof and corresponding movement of the core of the LVDT 100. When operating at the knee of the curve, the differential voltage from the LVDT would be zero as would the reference signal 156, with the wobbler 32 being set to achieve maximum possible speed with substantially constant flow through the motor.

If the motor is operating with an opposing load which increases, the motor will slow down with resulting reduced flow through the flow-regulator valve which reduces the pressure differential acting thereon. The valve member 102 will shift to the left and cause corresponding movement of the core of the LVDT 100 which inputs a voltage to the control circuit. The control circuit outputs a current 174 to increase the displacement of the motor by adjustment of the wobbler 32. When the opposing load decreases in value or there is a shift to an aiding load, the motor speeds up with resulting increased flow through the regulator valve 70. There is an increase in the pressure differential which causes shift of the valve member 102 to an increased flow-restricting position and delivery of a voltage from the LVDT to the control circuit to output a current 174 which decreases the displacement of the motor by adjustment of the wobbler 32. The voltage of the LVDT can be of opposite phase, dependent on the direction of movement of the core from the null position.

The control system adjusts the wobbler to achieve a desired differential pressure across the flow-regulator for operation at the knee of the flow-regulator pressure curve. By using a plus/minus 3% flow-regulator valve, the performance degradation due to tolerances is 6% on flow and 1% on pressure, which is a much smaller performance degradation than in those systems where both wobbler angle and speed of motor rotation is measured and wherein tolerances can yield performance degradation of 10%-15%.

The control circuit enables a controlled snub operation as the load approaches a commanded position. With the summing block 128 comparing a speed command signal with a speed feedback signal and with the speed command being driven by a position loop, it will be seen that the speed command signal becomes smaller as the load position approaches the commanded position. Therefore, the reference signal 156 used in the summing block 154 becomes smaller and as this occurs the control current 174 will drive the wobbler 32 toward a maximum displacement position to achieve a reduced motor speed. Additionally, there can be a decel command 140, previously referred to, which can provide for controlled deceleration of the motor 10.

The valve drive 173 receives an enable signal through a line 200 which also passes to the integrator preset block 159 and also a failsafe signal through line 201.

The disclosed invention allows precise flow control on a system which is energized for a very short period of time. The member to be moved may require movement be accomplished in as little as five seconds. With a short energized time, the control system of a conventional power drive unit cannot compensate for wobbler valve null shifts by integrating the error with a large time constant integrator. In the invention disclosed herein, the signal from the LVDT 100 applies a proportional current to the electro-hydraulic servo valve 48 working against the spring 45. The control loop does not monitor current or wobbler position; only flow through the flow-regulator by means of the output voltage from the LVDT 100.

In one specific embodiment of the invention, the speed of the motor shaft 11 can vary from 1 rpm to 2.125 rpm at a constant 11.0 gpm depending on load. At the high opposing loads, the rate of rotation is low and, as the load decreases and goes to aiding, the speed will increase to 2.125 rpm. The control for the power drive unit provides the maximum speed possible, depending on the load condition at a substantially constant flow.

We claim:

1. A hydraulic power drive unit having a variable displacement motor for moving a load under both aiding and opposing load conditions at the maximum speed possible for the load condition with a substantially constant desired rate of fluid flow throug the motor comprising, means for adjusting motor displacement, means for regulating fluid flow from the motor including a flow-regulating valve having a valve member positionable in response to a flow responsive pressure differential, and means responsive to a variation in said desired rate of fluid flow as detected by the flow-regulating means for operating said motor displacement adjusting means including a circuit having a linear variable differential transformer movable by said valve member.

2. A hydraulic power drive unit as defined in claim 1 including means for operating said motor displacement adjusting means to reduce the motor speed as the load approaches a desired position.

3. A hydraulic power drive unit as defined in claim 1 including means for increasing the displacement of the motor to reduce the motor speed as the motor-driven load approaches a commanded position.

4. A control for a variable displacement motor to achieve maximum possible motor speed with a substantially uniform rate of fluid flow through the motor operable with both aiding and opposing loads comprising, displacement-varying means for the motor, control means for the displacement-varying means, flow-responsive means for sensing the rate of fluid flow from the motor including a flow-regulating valve having a valve member positionable in response to a flow responsive pressure differential, and means operable when the rate of fluid exceeds a predetermined value for causing said control means to operate the displacement-varying means to reduce the displacment of the motor including a circuit having a linear variable differential transformer movable by said valve member.

5. A control valve as defined in claim 4 wherein said valve member has an orifice through which the fluid flow from the motor passes to create a pressure difference variable with the rate of fluid flow.

6. A control as defined in claim 4 wherein said control means includes means operable to increase the motor displacement as the motor-driven load approaches a commanded position to reduce motor speed for a controlled snubbing action.

7. A hydraulic power drive unit having a variable displacement motor and means for controlling the displacement of the motor to maximize the speed of the motor operating under varying loads and supplied with motive fluid at a substantially uniform rate of flow comprising, a flow-regulating valve through which fluid flows from the motor, adjustable means for setting the displacement of the motor, control means for said setting means to maintain a rate of flow through the flow-regulating valve within a predetermined range, and means including a linear variable differential transformer operable by the flow-regulating valve for sensing the rate of flow through said flow-regulating valve in excess of said predetermined range for causing said displacement-setting means to reduce the displacement of the motor and increase the speed of the motor.

8. A hydraulic power drive unit having an adjustable variable displacement motor responsive to a speed command for moving a load under both aiding and opposing load conditions at the maximum speed possible for the load condition with a substantially constant desired rate of fluid flow through the motor comprising, an electro-hydraulic servo control coupled to a wobbler and responsive to a speed signal for positioning the wobbler, a flow-regulating valve connected to said motor for regulating fluid flow from the motor and having a valve member positionable in response to a flow-induced pressure differential which varies with the load on the motor, a linear variable differential transformer connected to said valve member for outputting an output signal when the valve member has moved to shift the linear variable differential transformer from a null position, and control circuit means including said electrohydraulic servo control and said linear variable differential transformer for summing said output signal with the speed signal to control said servo control for setting the position of the wobbler.

* * * * *